United States Patent
Montemayor et al.

(10) Patent No.: US 8,144,261 B2
(45) Date of Patent: Mar. 27, 2012

(54) SYSTEMS AND METHODS FOR OPTICAL BLOCK LEVEL ADJUSTMENT OF REAR PROJECTION TVS

(75) Inventors: José Daniel Barocio Montemayor, Tijuana (MX); Horman Armando Millán Sánchez, Tijuana (MX)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1211 days.

(21) Appl. No.: 11/728,922

(22) Filed: Mar. 26, 2007

(65) Prior Publication Data
US 2008/0094526 A1 Apr. 24, 2008

Related U.S. Application Data

(60) Provisional application No. 60/854,190, filed on Oct. 24, 2006, provisional application No. 60/854,196, filed on Oct. 24, 2006, provisional application No. 60/854,189, filed on Oct. 24, 2006.

(51) Int. Cl.
*H04N 9/31* (2006.01)
(52) U.S. Cl. ........................................ 348/744; 348/745
(58) Field of Classification Search .................. 348/744, 348/745, 805–807; *H04N 9/31*
See application file for complete search history.

(56) References Cited

U.S. PATENT DOCUMENTS

| | | | | |
|---|---|---|---|---|
| 3,719,419 | A | * | 3/1973 | Davee ............................ 353/101 |
| 7,731,369 | B2 | * | 6/2010 | Cadio et al. ..................... 353/74 |
| 2004/0263790 | A1 | * | 12/2004 | VanOverloop et al. .......... 353/31 |
| 2006/0038927 | A1 | * | 2/2006 | Saletta ........................... 348/745 |

* cited by examiner

Primary Examiner — Trang U Tran
(74) Attorney, Agent, or Firm — John L. Rogitz

(57) ABSTRACT

In a rear-projection TV system in which the image is generated by an optical engine and projected through a mirror towards a diffusion plate screen, picture quality adjustment is undertaken at the optical block level to reduce the distance between the adjustment device and screen and thereby improve production throughput in the dark room in which the adjustments are made.

8 Claims, 1 Drawing Sheet

SYSTEMS AND METHODS FOR OPTICAL BLOCK LEVEL ADJUSTMENT OF REAR PROJECTION TVS

RELATED APPLICATIONS

This application claims priority from U.S. provisional patent application Ser. Nos. 60/854,190, 60/854,196, and 60/854,189, all filed Oct. 24, 2006.

I. FIELD OF THE INVENTION

The present invention relates generally to TV adjustments during production, and more particularly to relieving adjustment dark room bottlenecks.

II. BACKGROUND OF THE INVENTION

Many modern video displays such as the Sony Grand Wega™ television use three microdisplays, one each for the primary colors of red, green, and blue. Each microdisplay can be, e.g., a liquid crystal display (LCD). To display an image on the screen, the LCDs are illuminated by a bright lamp and through a set of lenses and prisms the final image is expanded to fill relatively large screens. The LCDs with lenses and prisms may be referred to as the "optical block" of the TV.

As understood herein, it is difficult at best to manufacture LCDs to have precisely uniform thicknesses, and even very small variations in thickness cause non-uniformity in the screen display such that some areas of the screen might appear to be brighter than others or tinged with artificial color. This undesirable appearance is magnified when the output of the LCD is optically expanded as is done in microdisplay televisions.

Accordingly, the present invention recognizes that a microdisplay uniformity adjustment process should be employed during TV production to compensate for imperfections in LCD thickness. Modern display measurement systems (DMS) or CCD imaging systems accordingly have been provided to undertake such compensation using a method known as "3D gamma" compensation or adjustment. DMS can include digital signal processing circuitry that can perform 3D gamma adjustment through the use of look-up-tables to improve luminance and chrominance uniformity all over the screen. Additional adjustments that may be made include white balance and contrast.

One or more of the above adjustments are undertaken in dark rooms, in which the optical block is caused to illuminate the screen of the TV, with the illumination being analyzed and used to effect the adjustment. With particular regard to 3D gamma adjustment, a calibration computer is operated to "adjust" the display controller chip by effectively "adding" or "subtracting" display element drive offsets (typically stored in the chip's memory) for each region as needed to achieve uniformity, usually with respect to a center region.

The present invention recognizes that owing to typically limited dark room space, the dark room adjustment processes can cause production bottlenecks. As further recognized herein, effecting picture quality adjustments at the level of the optical block can relieve production bottlenecks in the dark room.

SUMMARY OF THE INVENTION

A method for making an adjustment such as a 3D gamma adjustment to a TV having a screen and a projection lens includes disposing an adjustment lens between the projection lens and the screen. An image is generated through the adjustment lens onto the screen, and the image covers substantially less than all the screen. For instance, the image might cover only 30% or less of the screen. Based on the image, a feedback signal is generated and used to undertake an adjustment of the TV, after which the adjustment lens is removed from the TV prior to vending the TV. The TV may be a rear projection TV including plural microdisplays.

In non-limiting implementations the adjustment lens has a focal length of less than two hundred fifty millimeters. The feedback signal can be generated by a display measurement systems (DMS) disposed behind the screen relative to the adjustment lens. In preferred non-limiting embodiments the adjustment lens can be an aspheric positive meniscus lens that has one aspheric surface and an opposed spherical surface and that is made of low dispersion polymer.

In another aspect, a TV adjustment system includes a dark room in which a TV can be disposed to perform adjustments thereon. The system also includes an adjustment lens that can be coupled to the TV for making adjustments. The adjustment lens is decoupled from the TV prior to vending the TV. A feedback signal generator generates a feedback signal that is useful for adjusting the TV. The feedback signal generator is positionable closer to the TV in the dark room owing to the adjustment lens than it otherwise would be without the adjustment lens.

In yet another aspect, a rear projection TV includes plural microdisplays that are driven by one or more video controller integrated circuits (IC). The TV also has a projection lens and a screen that is substantially filled with an image generated by the microdisplays and projected onto the screen by the projection lens. The video controller IC embodies a 3D gamma adjustment made using a temporarily installed adjustment lens.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
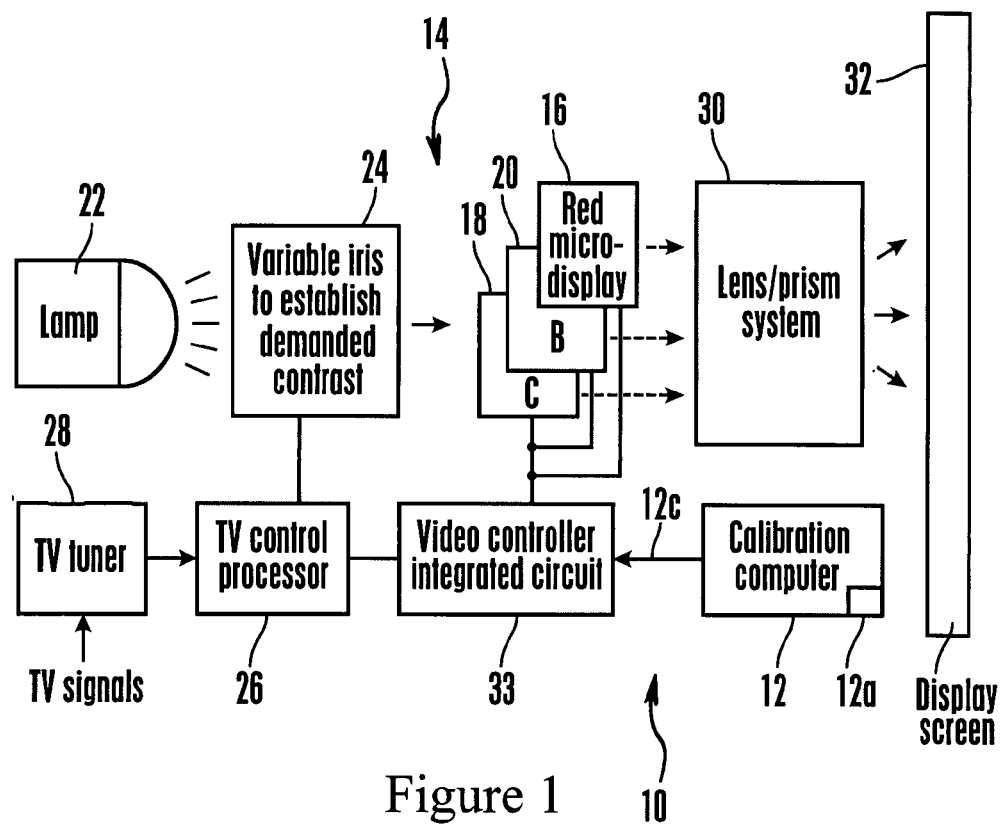
FIG. 1 is a block diagram of a non-limiting microdisplay TV with calibration computer.

Referring initially to FIG. 1, a system is shown, generally designated 10, that includes a TV 14 having red, green, and blue microdisplays 16, 18, 20. The microdisplays 16-20 may be LCDs that are illuminated by one or more lamps 22. In some implementations the lamps 22 can illuminate the displays 16-20 through a dynamically variable iris 24, with the iris 24 being controlled by a TV control processor 26 in accordance with dynamic iris control principles known in the art to establish display brightness. The TV processor 26 can control the iris 24 and LCDs 16-20 as appropriate to display a TV video signal from a TV tuner 28 as shown. As shown in FIG. 1, light from the microdisplays 16-20 is directed through a lens/prism system 30 onto a relatively large TV display screen 32 to render a video image on the screen 32 that is viewable by a person.

Either the TV processor 26 or, in the embodiment shown in FIG. 1, a video controller integrated circuit (IC) 33 that may communicate with the TV processor 26, controls the LCDs 16-20. In one non-limiting embodiment the adjustment computer discussed below may communicate with the video controller IC 33 using, e.g., I2C communication principles to establish uniformity adjustments in the memory of the IC 33 for 3D gamma adjustment. White balance and other adjustments may also be made.

Figure 2:
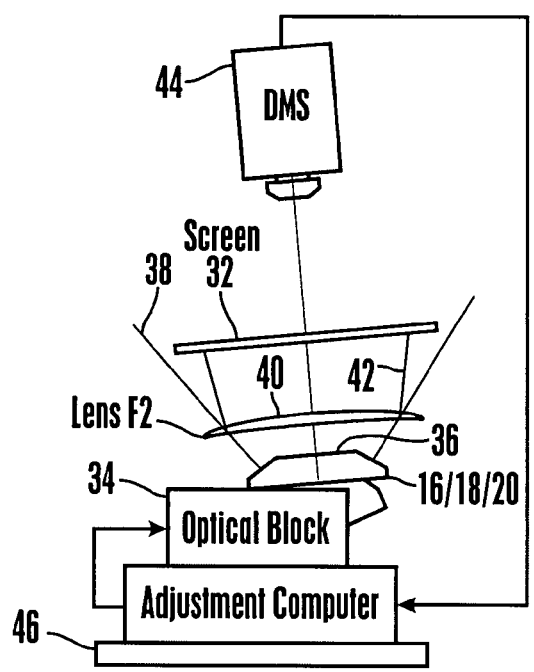
FIG. 2 is a schematic diagram showing a non-limiting adjustment system in combination with the optical block component of a rear projection TV.

Now referring to FIG. 2 for an understanding of a non-limiting embodiment of how certain production adjustments are made in accordance with present principles, and using 3D gamma adjust as an example, an optical block 34 of the TV 14 is shown. The optical block 34 includes the LCDs 16-20 (with the respective video controller ICs 33 of FIG. 1) that project light through a projection lens 36 that is part of the lens/prism system 30 shown in FIG. 1. The light from the projection lens 36 is directed against the display screen 32 as shown. As the dashed lines 38 indicate, the configuration of the projection lens 36 and its position and orientation relative to the screen 32 are established such that during normal TV operation the image projected onto the screen 32 substantially fills the entire screen and substantially only the entire screen 32. The projection lens 36 is designed to image the pixels of the LCDs 16-20 onto the screen with a high resolution, and with low chromatic and distortion aberrations.

The present invention recognizes that dark room adjustment bottlenecks during production can be reduced by reducing the space required to undertake the adjustments. To this end, the present invention recognizes that for dark room adjustment purposes, it is desirable to reduce the image size and projection distance of the optical engine, and in the non-limiting implementation shown in FIG. 2 this is done by a temporary adjustment lens (or lenses) 40 that is/are disposed between the projection lens 36 and screen 32, preferably with the focal point of the adjustment lens 40 located between the lens 40 and the LCDs 16-20. The focal length of the adjustment lens 40 may be between one hundred fifty millimeters and two hundred fifty millimeters (150 mm-250 mm).

As shown by the solid lines 42, the adjustment lens 40 is configured such that the image projected onto the screen 32 fills only a portion of the screen 32. In one non-limiting implementation the image that is projected through the adjustment lens 40 fills only about 30% of the screen 32 and more preferably fills only about 15%-25% of the screen. Consequently, the distance between the screen 32 and an adjustment DMS 44 that must detect the projected image and generate a feedback signal in response is less than it would be without the adjustment lens 40. The DMS 44, which detects the image on the screen 32, sends feedback signals to an adjustment computer 46 as shown, which, e.g., can establish uniformity adjustments in the memory of the IC 33 for 3D gamma adjustment as well as undertake other adjustments.

In one implementation, a high quality image is formed on the screen 32 with very low optical aberrations, particularly low geometrical distortion, by using an aspheric positive meniscus lens as the adjustment lens 40. The lens 40 may be made of low dispersion polymer and may have one aspheric surface and an opposed spherical surface to establish a high divergence, distortion free image. The adjustment lens 40 is configured to minimize optical aberrations including spherical aberration, coma, field curvature, and distortion. In less preferred implementations the adjustment lens 40 may be established by plural achromatic lenses.

Accordingly, it may now be appreciated that the TV may be brought into a dark room for adjustment including 3D gamma adjustment and the adjustment lens 40 temporarily coupled to the optical block 34 as shown in FIG. 2. Necessary imaging and feedback by the DMS 44 and adjustment by the adjustment computer 46 are then performed in accordance with conventional principles, except that, owing to the adjustment lens 40, the DMS 44 advantageously can be placed closer to the screen 32 than it otherwise could be, thereby conserving dark room space. After adjustment, the adjustment lens 40 is removed from the system and the TV subsequently vended with only the projection lens 36 projecting an image onto the screen 32.

While the particular SYSTEMS AND METHODS FOR OPTICAL BLOCK LEVEL ADJUSTMENT OF REAR PROJECTION TVs is herein shown and described in detail, it is to be understood that the subject matter which is encompassed by the present invention is limited only by the claims.

What is claimed is:

1. A method for making at least one adjustment in a TV having a screen and at least one projection lens, comprising:
   disposing at least one adjustment lens between the projection lens and the screen;
   generating an image through the adjustment lens onto the screen, the image covering less than all the screen;
   based on the image, generating at least one feedback signal;
   at least in part using the feedback signal, undertaking at least one adjustment of the TV;
   removing the adjustment lens from the TV prior to vending the TV; and
   vending the TV without the adjustment lens installed in the TV.

2. The method of claim 1, wherein the TV is a rear projection TV including plural microdisplays.

3. The method of claim 1, wherein the image covers less than 30% of the screen.

4. The method of claim 1, wherein the adjustment lens has a focal length of less than two hundred fifty millimeters.

5. The method of claim 1, wherein the feedback signal is generated by a display measurement systems (DMS) disposed behind the screen relative to the adjustment lens.

6. The method of claim 1, wherein the adjustment lens is an aspheric positive meniscus lens.

7. The method of claim 6, wherein the adjustment lens has one aspheric surface and an opposed spherical surface.

8. The method of claim 7, wherein the adjustment lens is made of low dispersion polymer.

* * * * *